United States Patent
Georgin (10) Patent No.: US 10,800,387 B1
(45) Date of Patent: Oct. 13, 2020

(54) RETRACTABLE ELECTRONIC WEAR PIN

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/370,143

(22) Filed: Mar. 29, 2019

(51) Int. Cl.
  *F16D 66/00* (2006.01)
  *B60T 8/17* (2006.01)
  *B64C 25/44* (2006.01)
  *B60T 13/74* (2006.01)
  *F16D 65/18* (2006.01)
  *B60T 8/88* (2006.01)
  *B60T 8/171* (2006.01)

(52) U.S. Cl.
  CPC ............ *B60T 8/1703* (2013.01); *B64C 25/44* (2013.01); *B60T 8/171* (2013.01); *B60T 8/885* (2013.01); *B60T 13/741* (2013.01); *B60T 2270/406* (2013.01); *F16D 65/183* (2013.01)

(58) Field of Classification Search
  CPC ....... B60T 8/1703; B64C 25/44; F16D 66/00; F16D 66/021; F16D 66/022; F16D 66/23; F16D 66/025
  See application file for complete search history.

(56) References Cited

U.S. PATENT DOCUMENTS

| | | | | |
|---|---|---|---|---|
| 3,018,852 A | * | 1/1962 | Stanton | F16D 65/46 188/72.3 |
| 4,186,822 A | * | 2/1980 | Khuntia | F16D 66/02 116/208 |
| 4,658,936 A | * | 4/1987 | Moseley | F16D 55/40 116/208 |
| 4,800,991 A | * | 1/1989 | Miller | B60T 17/22 116/208 |
| 5,767,768 A | * | 6/1998 | DiSaverio | B60T 8/171 188/1.11 R |
| 6,003,640 A | * | 12/1999 | Ralea | B60T 8/1703 188/1.11 L |
| 6,076,639 A | * | 6/2000 | Dahlen | F16D 66/02 188/1.11 R |
| 6,460,659 B1 | * | 10/2002 | Schaffer | F16D 66/02 188/1.11 R |
| 6,929,333 B2 | * | 8/2005 | DeVlieg | B60T 8/1703 188/1.11 L |
| 8,201,666 B2 | | 6/2012 | DeVlieg | |
| 9,061,674 B2 | | 6/2015 | Cahill | |
| 2019/0023244 A1 | | 1/2019 | Mastrocola et al. | |

* cited by examiner

*Primary Examiner* — Vishal R Sahni
(74) *Attorney, Agent, or Firm* — Snell & Wilmer L.L.P.

(57) ABSTRACT

A brake wear component is disclosed. In various embodiments, the component includes a linear position sensor disposed within a housing and configured to contact a pressure plate of a brake mechanism; a bias element coupled to the linear position sensor and configured to bias the linear position sensor a distance away from the pressure plate during a deactivated state; and an actuating mechanism coupled to the linear position sensor and configured to translate the linear position sensor toward the pressure plate during an activated state.

16 Claims, 5 Drawing Sheets

RETRACTABLE ELECTRONIC WEAR PIN

FIELD

The present disclosure relates to aircraft wheel and brake assemblies and, more particularly, to brake wear sensors or components used in aircraft wheel and brake assemblies.

BACKGROUND

Aircraft typically utilize brake systems on wheels to slow or stop the aircraft during landings, taxiing and emergency situations, such as, for example, rejected takeoffs. The brake systems generally employ a heat sink comprising a series of friction disks, sandwiched between a pressure plate and an end plate, that may be forced into sliding contact with one another during brake applications to slow or stop the aircraft. Under various conditions, brake applications may generate high temperatures and frictional loads throughout the heat sink and particularly on the surfaces of the stators and rotors and the pressure plate and the end plate that comprise the heat sink. The stators and rotors and the pressure plate and the end plate withstand and dissipate the heat generated by the frictional loads. The frictional loads, however, eventually cause the stators and rotors and the pressure plate and the end plate to wear to a point where the heat sink should be serviced or replaced. Brake wear sensors or components may be used to monitor the health of the heat sink and provide an indication when service or replacement is warranted, either currently or at a predicted future time.

SUMMARY

A brake wear component is disclosed. In various embodiments, the component includes a linear position sensor disposed within a housing and configured to contact a pressure plate of a brake mechanism; a bias element coupled to the linear position sensor and configured to bias the linear position sensor a distance away from the pressure plate during a deactivated state; and an actuating mechanism coupled to the linear position sensor and configured to translate the linear position sensor toward the pressure plate during an activated state.

In various embodiments, the linear position sensor includes a shaft having a first end configured to contact the pressure plate and a second end coupled to a piston. In various embodiments, the piston includes a fluid face disposed within the housing. In various embodiments, the housing and the fluid face define a volume configured to receive a pressurized hydraulic fluid during the activated state. In various embodiments, the bias element comprises a coil spring. In various embodiments, the coil spring is disposed within the housing and configured to provide a compressive load against the piston.

In various embodiments, the actuating mechanism is a hydraulic actuator configured to receive a pressurized hydraulic fluid during the activated state. In various embodiments, the linear position sensor is a linear variable differential transformer. In various embodiments, the bias element is a coil spring. In various embodiments, the coil spring defines a pre-rating selected to maintain the distance prior to a pressure of the pressurized hydraulic fluid reaching or exceeding a pressure threshold.

A brake mechanism is disclosed. In various embodiments, the brake mechanism includes a pressure plate; and a brake wear component, the brake wear component including a linear position sensor disposed within a sensor housing and configured to contact the pressure plate, a bias element coupled to the linear position sensor and configured to bias the linear position sensor a distance away from the pressure plate during a deactivated state, and an actuating mechanism coupled to the linear position sensor and configured to translate the linear position sensor toward the pressure plate during an activated state in response to a brake input device coupled to at least one of an emergency brake system or a parking brake system.

In various embodiments, the linear position sensor comprises a shaft having a first end configured to contact the pressure plate and a second end coupled to a piston. In various embodiments, the sensor housing and the piston define a volume configured to receive a pressurized hydraulic fluid during the activated state. In various embodiments, the bias element comprises a coil spring configured to provide a compressive load against the piston.

In various embodiments, an auxiliary brake system valve is configured to supply a pressurized hydraulic fluid to the actuating mechanism during the activated state. In various embodiments, the auxiliary brake system valve is operably coupled to a brake input device. In various embodiments, the bias element is a coil spring having a pre-rating selected to maintain the distance prior to a pressure of the pressurized hydraulic fluid reaching or exceeding a pressure threshold.

A method of monitoring a length of a brake stack or a change in the length of the brake stack is disclosed. In various embodiments, the method includes the steps of applying a pressurized hydraulic fluid to a linear position sensor positioned adjacent the brake stack; translating the linear position sensor a translational distance by action of the pressurized hydraulic fluid; and converting the translational distance to the length of the brake stack or to the change in the length of the brake stack.

In various embodiments, the translating the linear position sensor the translational distance by action of the pressurized hydraulic fluid includes translating the linear position sensor a nominal separation distance plus a wear distance. In various embodiments, the applying the pressurized hydraulic fluid to the linear position sensor includes activating an auxiliary brake system valve configured to supply the pressurized hydraulic fluid to an actuator coupled to the linear position sensor during an activated state.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
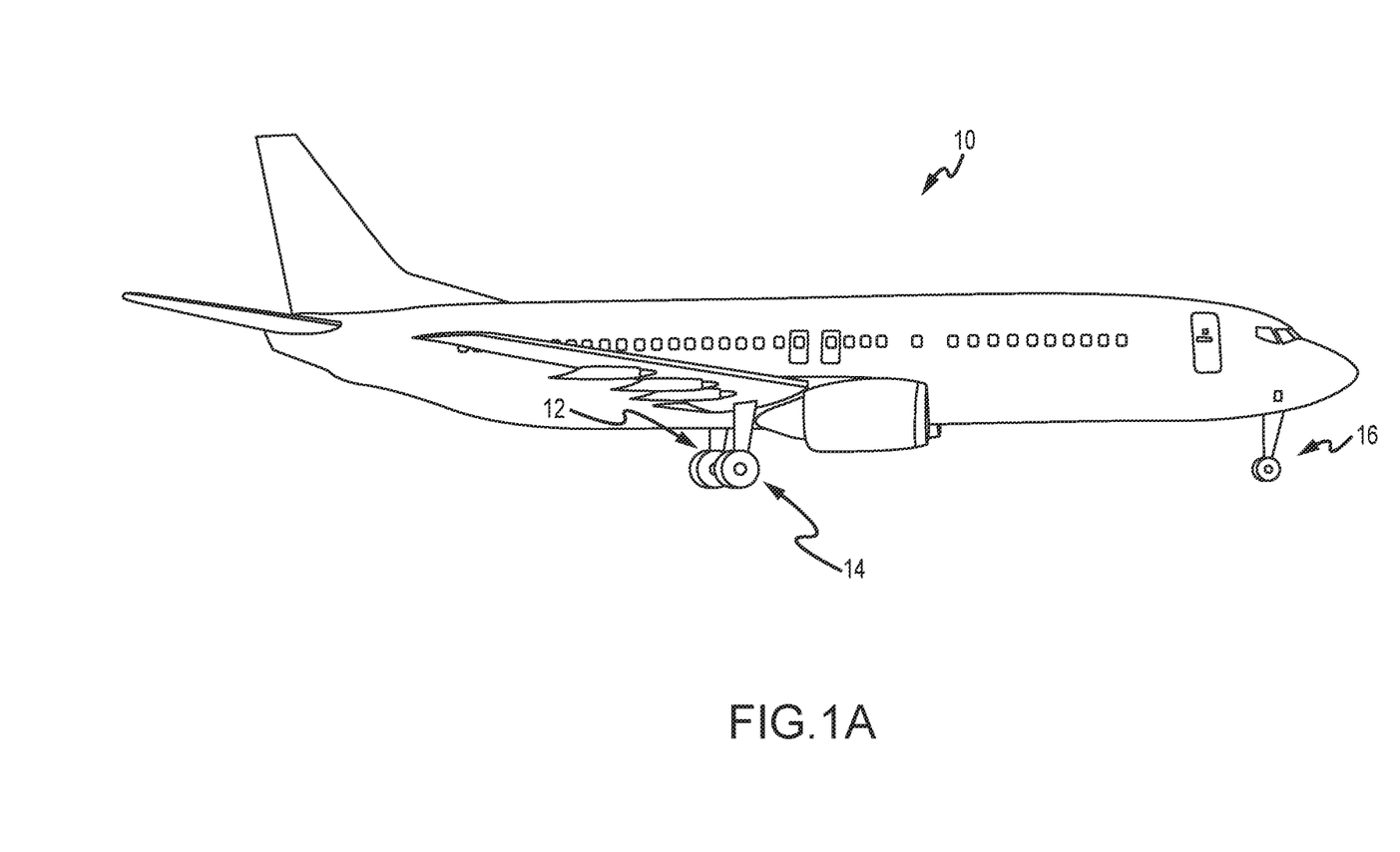
FIG. 1A illustrates an exemplary aircraft having a brake system, in accordance with various embodiments.
Figure 1B:
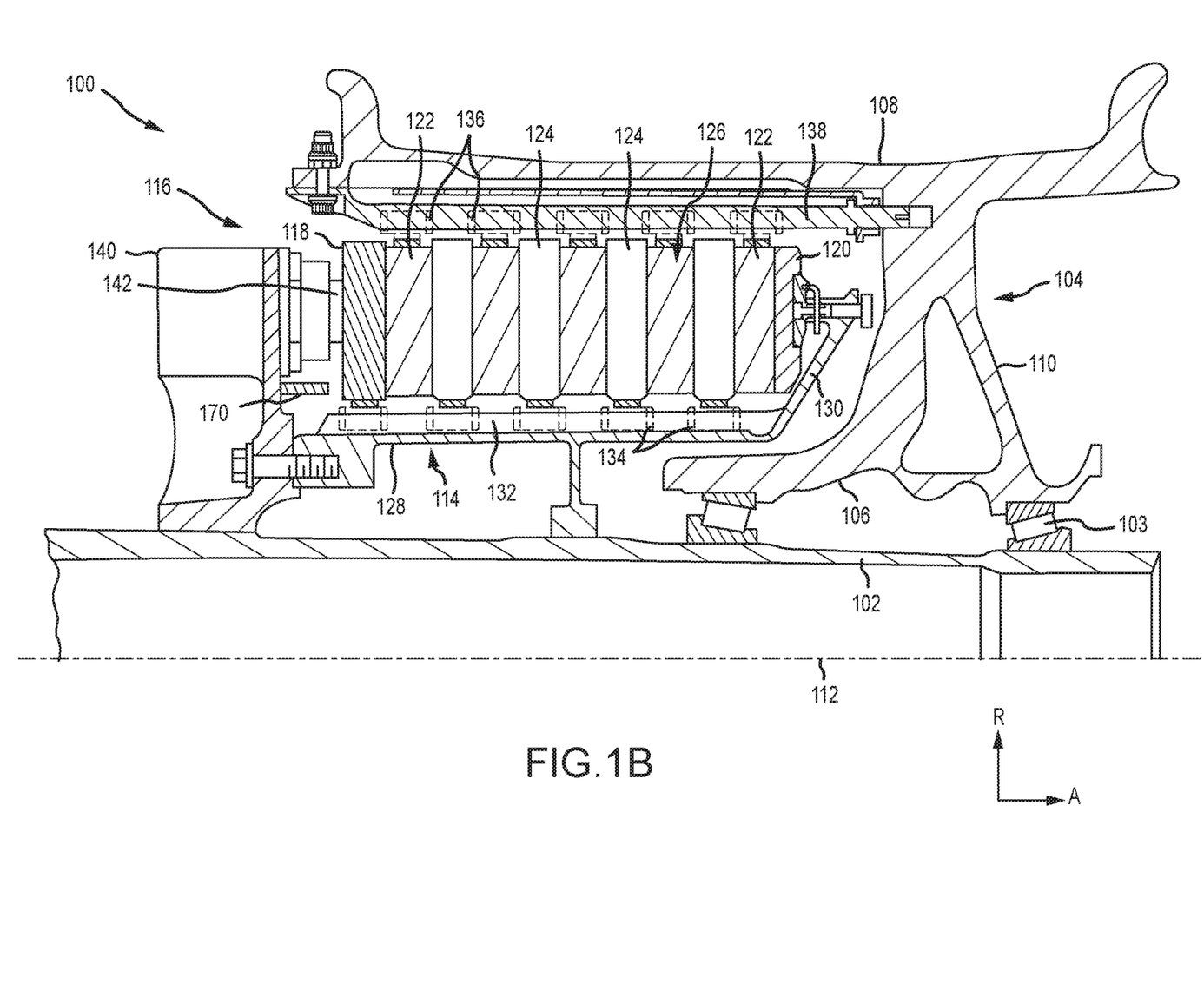
FIG. 1B illustrates a cross-sectional view of a brake mechanism, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted relative to an axle 102 for use with a wheel 104 disposed on and configured to rotate about the axle 102 via one or more bearing assemblies 103. A central axis 112 extends through the axle 102 and defines a center of rotation of the wheel 104. A torque plate 114 (sometimes referred to as a torque tube) is aligned concentrically with the wheel 104, which is rotatable relative to the torque plate 114.

The brake mechanism 100 includes a piston housing assembly 116, a pressure plate 118 disposed adjacent the piston housing assembly 116, an end plate 120 positioned a distal location from the piston housing assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake stack 126 (or brake heat sink). The pressure plate 118, the end plate 120 and the plurality of stator disks 124 are connected to the torque plate 114 and remain rotationally stationary relative to the axle 102. The plurality of rotor disks 122 are connected to the wheel 104 and rotate relative to the pressure plate 118, the end plate 120 and the plurality of stator disks 124.

The torque plate 114 may include an annular barrel or torque tube 128 and an annular plate or back leg 130. The back leg 130 is disposed at an end distal from the piston housing assembly 116 and may be made monolithic with the torque plate 114, as illustrated in FIG. 1B, or may be made as a separate annular piece and suitably connected to the torque tube 128. The torque plate 114 has a plurality of circumferentially spaced and axially extending splines 132 disposed on an outer surface of the torque tube 128. The plurality of stator disks 124 and the pressure plate 118 include notches or slots 134 on an inner periphery of the disks and the plate for engagement with the splines 132, such that each disk and the plate are axially slidable with respect to the torque tube 128. The end plate 120 is suitably connected to the back leg 130 of the torque plate 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or slots 136 along an outer periphery of each disk for engagement with a plurality of torque bars 138 that are secured to or made monolithic with an inner periphery of the wheel 104.

An actuating mechanism for the brake mechanism 100 includes a plurality of piston assemblies, circumferentially spaced around a piston housing 140 (only one piston assembly is illustrated in FIG. 1B). Each of the plurality of piston assemblies includes a piston 142 configured to apply a load against the pressure plate 118. Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

In various embodiments, a brake wear sensor 170 (or brake wear component) is disposed between the piston housing 140 and the pressure plate 118. The brake wear sensor 170 is configured to monitor wear occurring within the brake stack 126, primarily due to frictional contact occurring between adjacent surfaces of the pressure plate 118, the end plate 120, the plurality of rotor disks 122 and the plurality of stator disks 124. While the frictional contact slows or stops or otherwise prevents rotation of the wheel 104, it also causes wear to occur on the various surfaces within the brake stack 126. Over time, such wear may result in the various components just described becoming progressively thinner in the axial direction. The progressive thinning of the various components results in the need for longer travel of the piston within each piston assembly to affect braking. As described further below, in various embodiments, the brake wear sensor 170 is configured to monitor the progress of such wear within the brake stack 126 and to alert maintenance personnel when repair or replacement of the brake stack 126 is warranted.

Figure 2:
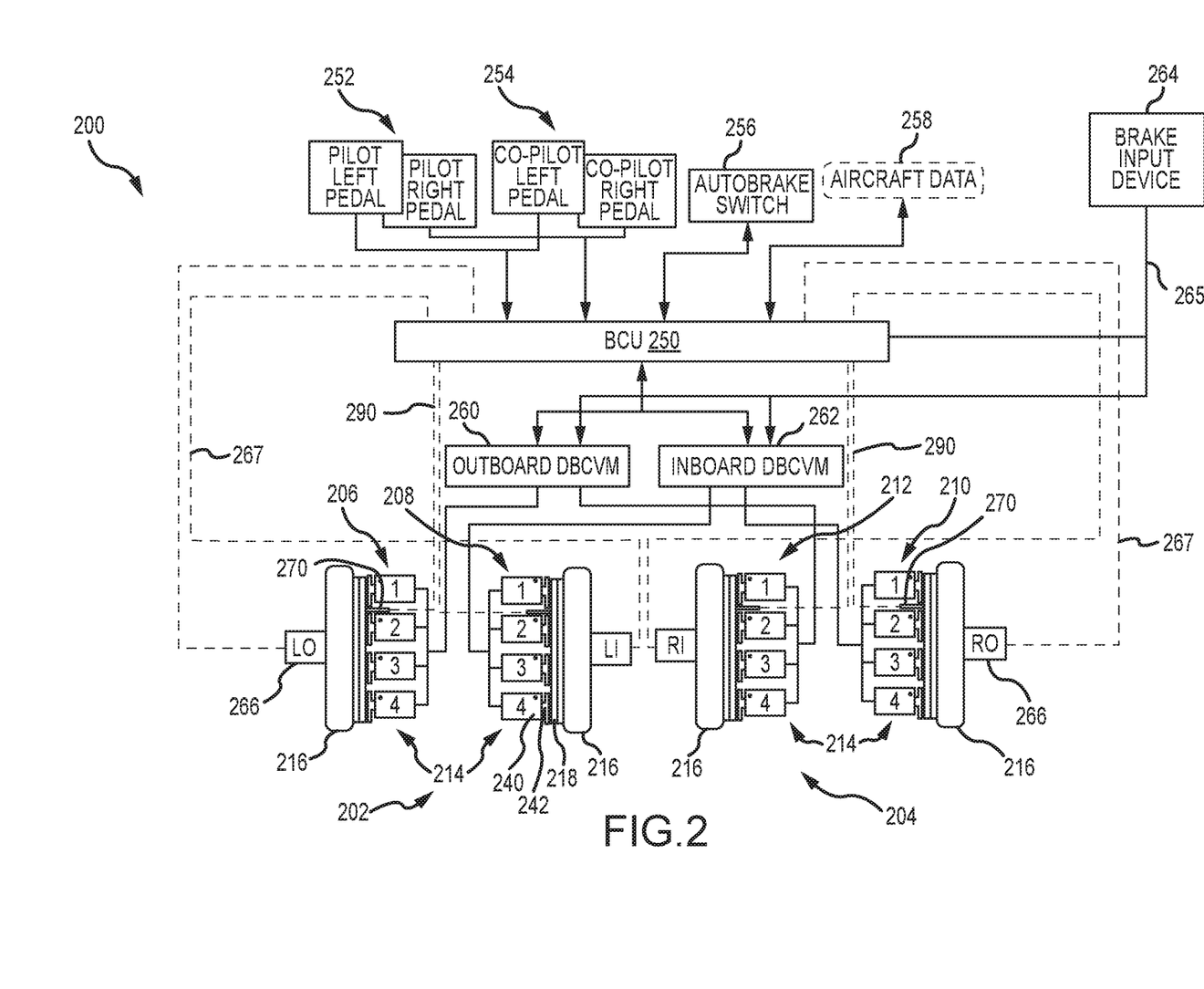
FIG. 2 illustrates a schematic view of a brake system, in accordance with various embodiments.

Referring now to FIG. 2, a schematic view of a brake system 200 is provided, in accordance with various embodiments. The brake system 200 includes a plurality of landing gear, such as, for example, a left main landing gear 202 and a right main landing gear 204. The left main landing gear 202 includes a left outboard brake mechanism 206 (LO) and a left inboard brake mechanism 208 (LI). Similarly, the right main landing gear includes a right outboard brake mechanism 210 (RO) and a right inboard brake mechanism 212 (RI). One or more tires 216 may be included with each of the left main landing gear 202 and the right main landing gear 204. Similar components as those described above and below may be included in additional landing gear, such as, for example, the nose landing gear 16 described above with reference to FIG. 1A. Additionally, while left and right orientations for the landing gear and brake mechanisms are described above, the same components may be referred to as a first landing gear and a second landing gear, each having a first brake mechanism and a second brake mechanism, without loss of generality. In various embodiments, each of the left outboard brake mechanism 206, the left inboard brake mechanism 208, the right outboard brake mechanism 210 and the right inboard brake mechanism 212 includes a plurality of actuators 214, labeled #1, #2, #3 and #4. Each of the plurality of actuators 214 may comprise a piston housing 240 and a piston 242 configured to apply a load against a pressure plate 218, similar to, for example, the piston housing 140, the piston 142 and the pressure plate 118 described above with reference to FIG. 1B.

In various embodiments, the brake system 200 is controlled by a brake control unit 250. The brake control unit (BCU) 250 is configured to receive various operator inputs, such as, for example, left and right pilot brake pedal signals from left and right pilot brake pedals 252 and left and right co-pilot brake pedal signals from left and right co-pilot brake pedals 254. The brake pedal signals can be generated, for example, via linear variable differential transformers (LVDTs) operatively coupled to the respective pedals. As the pedals are depressed, each LVDT generates a voltage signal corresponding to the degree of pedal deflection, and this voltage signal can be provided to the BCU 250. Other methods for generating the brake pedal signals may also be employed, including encoders, potentiometers, or the like. The BCU 250 may also receive other operator inputs, such as data from an autobrake switch 256 for configuring autobrake logic. The autobrake switch 256 may include several settings, such as, for example, an enable/disable input, an auto braking level input (e.g., low, medium, high) and a rejected take off (RTO) input (e.g., for enabling or disabling RTO functionality). In various embodiments, the BCU 250 may also receive other aircraft data input 258, such as, for example, from sensor data concerning pressure in hydraulic lines or temperatures of brake stacks.

In various embodiments, the BCU 250 is operatively coupled to one or more DBCVM's (Dual Brake Control Valve Module), including, for example, an outboard DBCVM 260 and an inboard DBCVM 262. In various embodiments, the outboard DBCVM 260 is configured to receive brake pressure signals from the BCU 250 and control operation of the left outboard brake mechanism 206 and the right outboard brake mechanism 210, while the inboard DBCVM 262 is configured to receive brake pressure signals from the BCU 250 and control operation of the left inboard brake mechanism 208 and the right inboard brake mechanism 212. In various embodiments, the BCU 250 is configured to derive the brake pressure signal based on brake data generated by the left and right pilot brake pedals 252 or the left and right co-pilot brake pedals 254 or on brake data generated by the autobrake switch 256 or the other aircraft data input 258, such as, for example, wheel speed signals. In various embodiments, the outboard DBCVM 260 and the inboard DBCVM 262 are hydraulically coupled to the plurality of actuators 214 and operate the piston 242 associated with each one of the plurality of actuators 214.

A brake input device 264 (e.g., a handle, lever, pedal, or the like), configured to activate or deactivate an auxiliary brake system such as, for example, a parking brake system, an emergency brake system or a combination parking brake/emergency brake system, provides a brake command signal, via one or more data buses 265, to each of the outboard DBCVM 260 and the inboard DBCVM 262 and to the BCU 250. The brake command signal can be generated using various techniques, such as, for example, an LVDT as described above with respect to the left and right pilot brake pedals 252 and left the left and right co-pilot brake pedals 254, or via an encoder or potentiometer configured to provide data corresponding to deflection or rotation of the brake input device 264. In various embodiments, the brake input device 264 includes a mode selector to indicate when normal or parking/emergency braking is desired. For example, the brake input device 264 may include contacts that are open when the brake input device 264 is in a first position (e.g., rotated to the left or pushed inward) and closed when the brake input device 264 is in a second position (e.g., rotated to the right or pulled outward).

In various embodiments, each of the outboard DBCVM 260 and the inboard DBCVM 262 are hydraulically coupled to one or more of the plurality of actuators 214 actuators. In various embodiments, a wheel speed sensor 266 is configured to provide wheel speed data to the BCU 250 for implementing anti-skid and autobrake functions. The wheel speed sensor 266 associated with each of the left main landing gear 202 and the right main landing gear 204, together with data from various temperature and pressure sensors, may be electrically coupled to the BCU 250 via one or more data buses 227. In addition, a brake wear sensor 270 (or a brake wear component), similar to the brake wear sensor 170 described above with reference to FIG. 1B, is incorporated into each of the left outboard brake mechanism 206, the left inboard brake mechanism 208, the right outboard brake mechanism 210 and the right inboard brake mechanism 212 and coupled to the BCU 250 via a brake wear sensor data bus 290. Given the various data inputs described above, the BCU 250 may be configured to monitor all components of the left main landing gear 202 and the right main landing gear 204, including, for example, all components within each of the left outboard brake mechanism 206, the left inboard brake mechanism 208, the right outboard brake mechanism 210 and the right inboard brake mechanism 212.

Figure 3A:
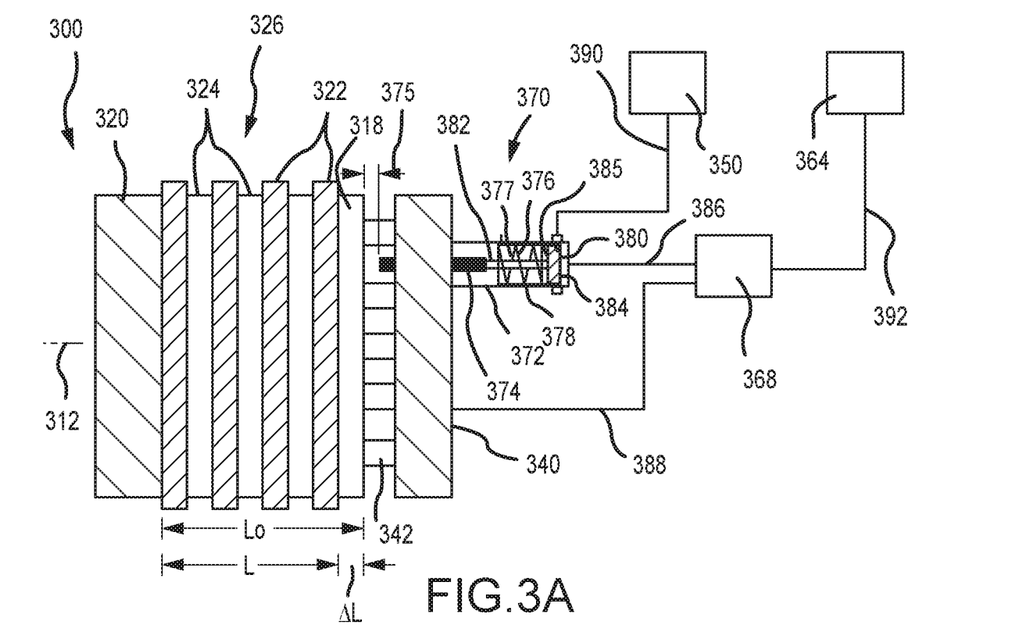
FIGS. 3A and 3B illustrate a schematic view of a brake mechanism having a brake wear sensor, in accordance with various embodiments.
Figure 3B:
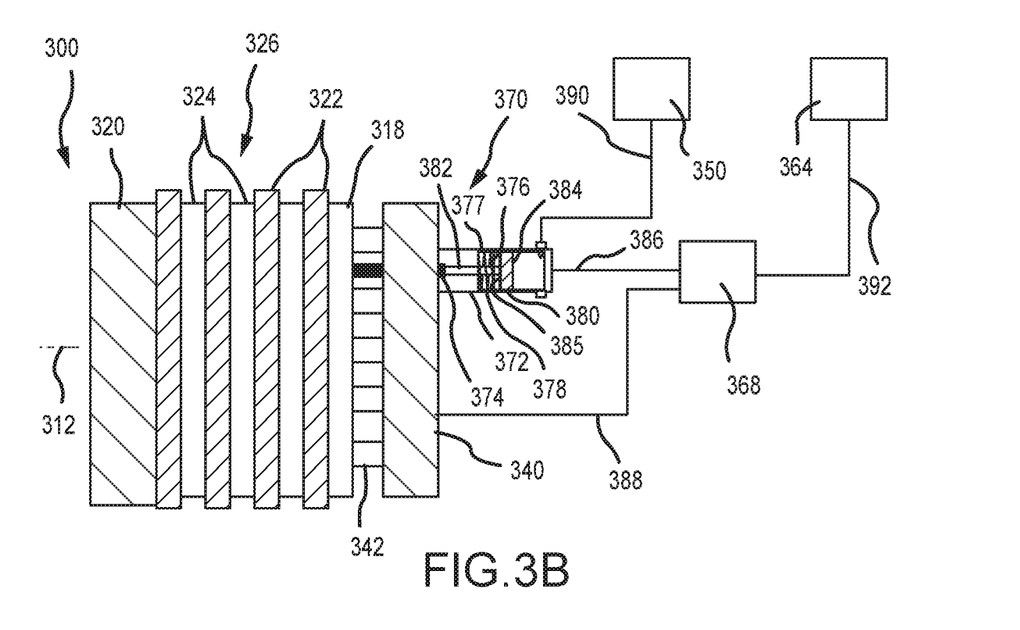

Referring now to FIGS. 3A and 3B, a brake mechanism 300 is illustrated. Similar to the description above with reference to FIG. 1B, the brake mechanism 300 includes a pressure plate 318 disposed adjacent a piston housing 340, an end plate 320 positioned a distal location from the piston housing 340, and a plurality of rotor disks 322 interleaved with a plurality of stator disks 324 positioned intermediate the pressure plate 318 and the end plate 320. The pressure plate 318, the plurality of rotor disks 322, the plurality of stator disks 324 and the end plate 320 together form a brake stack 326 (or a brake heat sink). The pressure plate 318, the end plate 320 and the plurality of stator disks 324 are configured to remain rotationally stationary relative to an axle, such as, for example, the axle 102 described above with reference to FIG. 1B, which is generally coaxial with respect to a central axis 312 that extends through the brake stack 326. The plurality of rotor disks 322 are connected to a wheel, such as, for example, the wheel 104 described above with reference to FIG. 1B, and rotate relative to the pressure plate 318, the end plate 320 and the plurality of stator disks 324. A piston 342 (or a plurality of pistons) is disposed within the piston housing 340 and configured to apply a load against the pressure plate 318 to affect a braking action.

Still referring to FIGS. 3A and 3B, the brake mechanism includes a brake wear sensor 370 (or a brake wear component), similar to the brake wear sensor 170 described above with reference to FIG. 1B and the brake wear sensor 270 described above with reference to FIG. 2. The brake wear sensor 370 is configured to monitor the state of frictional wear within the brake stack 326 and to relay to a BCU 350, via a brake wear sensor data bus 390, information that relates to the state of the frictional wear. In various embodiments, the BCU 350 is similar to the BCU 250 described above with reference to FIG. 2. Referring to FIG. 3A, for example, the brake wear sensor 370 includes a sensor housing 372 (which may comprises a structure external or internal to the piston housing 340 or be a part of the piston housing 340) and a linear position sensor 374 translationally disposed within the sensor housing 372. In various embodiments, the linear position sensor 374 may comprise a linear variable differential transformer (LVDT) or a similar mechanism configured to measure linear displacement or position. An actuating mechanism, such as, for example, a hydraulic actuator 378, may be disposed within or proximate the sensor housing 372 and be configured to translate the linear position sensor 374 away from the pressure plate 318 during a deactivated state, as illustrated in FIG. 3A, or toward the pressure plate 318 and to make contact with the pressure plate 318 during an activated state, as illustrated in FIG. 3B.

In various embodiments, the hydraulic actuator 378 may comprise a piston 380 coupled to the linear position sensor 374 via a shaft 382. In various embodiments, the shaft 382 may extend through or comprise a part of the linear position sensor 374 and include a first end configured for contact with the pressure plate 318 and a second end coupled to the piston 380. The hydraulic actuator 378 is activated by a pressurized hydraulic fluid provided to a fluid face 384 of the piston 380 (or to a volume defined by the piston 380 and the sensor housing 372) upon activation of an auxiliary brake system valve 368. In various embodiments, the auxiliary brake system valve 368 is activated (or turned on) in response to a brake input device 364, such as, for example, the brake input device 264 described above with reference to FIG. 2. In various embodiments, an activation link 392, which may be mechanical, electrical or hydraulic, couples the auxiliary brake system valve 368 to the brake input device 364. Activation of the auxiliary brake system valve 368 provides the pressurized hydraulic fluid to the fluid face 384 of the piston 380 via a first conduit 386 disposed between the hydraulic actuator 378 and the auxiliary brake system valve 368. At the same time, a second conduit 388, disposed between the piston housing 340 and the auxiliary brake system valve 368, provides the pressurized hydraulic fluid to the piston 342 (or to the plurality of pistons) in order to activate the brake mechanism 300. When the auxiliary brake system valve 368 is deactivated (or turned off), a bias element 376 urges the linear position sensor 374 away from the pressure plate 318, as illustrated in FIG. 3A. In various embodiments, the bias element 376 may comprise a coil spring 377 or a similar mechanism configured to provide a compressive load to a connecting face 385 of the piston 380.

Still referring to FIGS. 3A and 3B, operation of the brake wear sensor is described, in accordance with various embodiments. As illustrated in FIG. 3A, the linear position sensor 374 is retracted a distance 375 from the pressure plate 318. The distance 375 may be characterized as a nominal separation distance $D_0$ when the brake stack 326 is new or refurbished, which will increase to a value greater than Do as the brake stack 326 experiences wear. The distance 375 (equal to or greater than Do) is maintained throughout normal operation of the brake mechanism—e.g., during operation of the brake mechanism during landing or when controlled via one or more of a brake pedal or an autobrake switch, such as, for example, the left and right pilot brake pedals 252, the left and right co-pilot brake pedals 254 or the autobrake switch 256 described above with reference to FIG. 2. As the brake stack 326 experiences wear, the distance 375 will increase correspondingly, but will always be maintained at some positive value greater than or equal to Do. Maintaining the linear position sensor 374 at the distance 375 from the pressure plate 318 during normal brake operation protects or otherwise shields the linear position sensor 374 from severe vibration that may occur within the brake stack 326 during such normal brake operation, which may otherwise result in premature wear or failure of the linear position sensor 374 or the brake wear sensor 370 as a unit.

Following activation of the brake input device 364, the linear position sensor 374 translates toward and makes contact with the pressure plate 318 in response to the pressurized hydraulic fluid acting on the fluid face 384 of the piston 380. Depending on the state of frictional wear experienced by the brake stack 326, the linear position sensor 374 will translate the nominal separation distance $D_0$, plus a wear distance $\Delta L$ that is representative of the current length L of the brake stack 326, where the current length L of the brake stack 326 is equal to a nominal length $L_0$ of the brake stack 326 (e.g., when the brake stack 326 is new or refurbished) minus the wear distance $\Delta L$. A signal corresponding to a translational distance, or the total distance translated by the linear position sensor 374 (e.g., the nominal separation distance $D_0$ plus the wear distance $\Delta L$), is then provided to the BCU 350 via the brake wear sensor data bus 390. The BCU 350 then determines one or both of the wear distance $\Delta L$ and the current length L of the brake stack 326, or some other measure of wear of the brake stack 326, and reports this information to the pilots or to maintenance personnel via suitable indicators.

In various embodiments, the brake wear sensor 370 may be configured to activate only upon a pressure threshold being reached or exceeded by the pressure of the pressurized hydraulic fluid. This ensures that the linear position sensor 374 is not activated or urged against the pressure plate 318 during an application of the auxiliary brake system (e.g., via the brake input device 364) during situations other than when the plane is at rest. Such situations may occur, for example, when the auxiliary brake is applied during landing following failure of the regular brake system (e.g., during application of an emergency brake system). In various embodiments, the pressure threshold may be incorporated into the brake wear sensor 370 by incorporating a pressure threshold into the bias element 376. In various embodiments, for example, the coil spring 377 may be selected to include a pre-rating such that the coil spring will not compress, thereby preventing the linear position sensor 374 from translating toward the pressure plate 318, until the pressure threshold is reached or exceeded. A pre-rating of about 2,500 psi (≅17,200 kPa), for example, ensures the linear position sensor 374 will not activate during application of the auxiliary brake system during a landing situation, which typically employs a pressure of the pressurized hydraulic fluid on the order of 500 psi to 1,500 psi (≅3,500-10,500 kPa). On the other hand, a pre-rating of about 2,500 psi (≅17,200 kPa) ensures the linear position sensor 374 will activate during application of the auxiliary brake system during a parking situation (e.g., during application of a parking brake system), which typically employs a pressure of the pressurized hydraulic fluid on the order of 3,000 psi (≅21,000 kPa).

Figure 4:
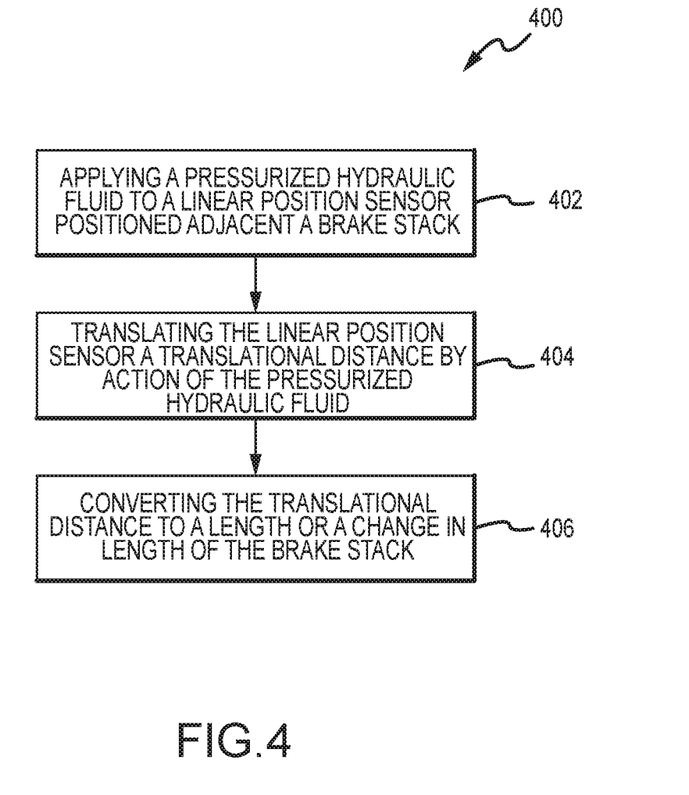
FIG. 4 describes a method of monitoring wear within a brake stack.

The foregoing provides an apparatus in which a length or a change in the length of a brake stack is monitored by a linear position sensor, activated by a pressurized hydraulic fluid and biased against translation by a bias element, such as, for example, a coil spring having a pre-rating. In various embodiments, a method of monitoring the length or the change in length of the brake stack includes measuring a translational distance of the linear position sensor following its translations toward and ultimate contact with a pressure plate following activation of an auxiliary brake system. Referring to FIG. 4, for example, a method 400 of monitoring a length or change in length of a brake stack, within a brake mechanism, is disclosed. In a first step 402, the method includes applying a pressurized hydraulic fluid to a linear position sensor positioned adjacent the brake stack. In a second step 404, the linear position sensor is translated a translational distance by action of the pressurized hydraulic fluid. In a third step 406, the translational distance is converted to the length or the change in length of the brake stack.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brake wear component, comprising:
   a linear position sensor disposed within a housing and configured to contact a pressure plate of a brake mechanism;
   a bias element coupled to the linear position sensor and configured to bias the linear position sensor a distance away from the pressure plate during a deactivated state; and
   an actuating mechanism coupled to the linear position sensor and configured to translate the linear position sensor toward the pressure plate during an activated state, wherein the actuating mechanism is a hydraulic actuator configured to receive a pressurized hydraulic fluid during the activated state in response to a brake input device coupled to at least one of an emergency brake system or a parking brake system,
wherein the linear position sensor is a linear variable differential transformer and
wherein the bias element is a coil spring.

2. The brake wear component of claim 1, wherein the linear position sensor comprises a shaft having a first end configured to contact the pressure plate and a second end coupled to a piston.

3. The brake wear component of claim 2, wherein the piston includes a fluid face disposed within the housing.

4. The brake wear component of claim 3, wherein the housing and the fluid face define a volume configured to receive the pressurized hydraulic fluid during the activated state.

5. The brake wear component of claim 2, wherein the coil spring is disposed within the housing and configured to provide a compressive load against the piston.

6. The brake wear component of claim 1, wherein the coil spring defines a pre-rating selected to maintain the distance prior to a pressure of the pressurized hydraulic fluid reaching or exceeding a pressure threshold.

7. A brake mechanism, comprising:
a pressure plate; and
a brake wear component, comprising
    a linear position sensor disposed within a sensor housing and configured to contact the pressure plate,
    a bias element coupled to the linear position sensor and configured to bias the linear position sensor a distance away from the pressure plate during a deactivated state, and
    an actuating mechanism coupled to the linear position sensor and configured to translate the linear position sensor toward the pressure plate during an activated state,
        wherein the actuating mechanism is a hydraulic actuator configured to receive a pressurized hydraulic fluid during the activated state in response to a brake input device coupled to at least one of an emergency brake system or a parking brake system,
        wherein the linear position sensor is a linear variable differential transformer and
        wherein the bias element is a coil spring.

8. The brake mechanism of claim 7, wherein the linear position sensor comprises a shaft having a first end configured to contact the pressure plate and a second end coupled to a piston.

9. The brake mechanism of claim 8, wherein the sensor housing and the piston define a volume configured to receive the pressurized hydraulic fluid during the activated state.

10. The brake mechanism of claim 8, wherein the coil spring is configured to provide a compressive load against the piston.

11. The brake mechanism of claim 7, further comprising an auxiliary brake system valve configured to supply the pressurized hydraulic fluid to the actuating mechanism during the activated state.

12. The brake mechanism of claim 11, wherein the auxiliary brake system valve is operably coupled to the brake input device.

13. The brake mechanism of claim 7, wherein the coil spring has a pre-rating selected to maintain the distance prior to a pressure of the pressurized hydraulic fluid reaching or exceeding a pressure threshold.

14. A method of monitoring a length of a brake stack or a change in the length of the brake stack, comprising:
applying a pressurized hydraulic fluid to a brake wear component positioned adjacent the brake stack, the brake wear component comprising
    a linear position sensor disposed within a sensor housing and configured to contact a pressure plate of the brake stack,
    a bias element coupled to the linear position sensor and configured to bias the linear position sensor a distance away from the pressure plate during a deactivated state, and
    an actuating mechanism coupled to the linear position sensor and configured to translate the linear position sensor toward the pressure plate during an activated state;
translating the linear position sensor a translational distance by action of the pressurized hydraulic fluid; and
converting the translational distance to the length of the brake stack or to the change in the length of the brake stack,
    wherein the actuating mechanism is a hydraulic actuator configured to receive the pressurized hydraulic fluid during the activated state in response to a brake input device coupled to at least one of an emergency brake system or a parking brake system,
    wherein the linear position sensor is a linear variable differential transformer and
    wherein the bias element is a coil spring.

15. The method of claim 14, wherein the translating the linear position sensor the translational distance by action of the pressurized hydraulic fluid includes translating the linear position sensor a nominal separation distance plus a wear distance.

16. The method of claim 15, wherein the applying the pressurized hydraulic fluid to the linear position sensor includes activating an auxiliary brake system valve configured to supply the pressurized hydraulic fluid to an actuator coupled to the linear position sensor during the activated state.

* * * * *

UNITED STATES PATENT AND TRADEMARK OFFICE
CERTIFICATE OF CORRECTION

PATENT NO. : 10,800,387 B1
APPLICATION NO. : 16/370143
DATED : October 13, 2020
INVENTOR(S) : Marc Georgin Page 1 of 1

It is certified that error appears in the above-identified patent and that said Letters Patent is hereby corrected as shown below:

On the Title Page

Item (65) please insert -- Prior Publication Data US 2020/0307530 A1 Oct. 01, 2020 --

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*